(12) United States Patent
Alvord et al.

(10) Patent No.: US 10,362,392 B2
(45) Date of Patent: Jul. 23, 2019

(54) AERIAL ACOUSTIC SENSING, ACOUSTIC SENSING PAYLOAD AND AERIAL VEHICLE INCLUDING THE SAME

(71) Applicant: Georgia Tech Research Corporation, Atlanta, GA (US)

(72) Inventors: David Alvord, Atlanta, GA (US); Alessio Medda, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/333,668

(22) Filed: Oct. 25, 2016

(65) Prior Publication Data

US 2017/0339487 A1    Nov. 23, 2017

Related U.S. Application Data

(60) Provisional application No. 62/338,084, filed on May 18, 2016.

(51) Int. Cl.
*H04R 3/00* (2006.01)
*B64C 39/02* (2006.01)
(Continued)

(52) U.S. Cl.
CPC .......... *H04R 3/005* (2013.01); *B64C 39/024* (2013.01); *B64D 43/00* (2013.01); *H04R 1/406* (2013.01);
(Continued)

(58) Field of Classification Search
CPC ........ H04R 3/005; H04R 1/406; H04R 1/028; H04R 2201/401; H04R 2201/403;
(Continued)

(56) References Cited

U.S. PATENT DOCUMENTS

| 8,319,620 B2* | 11/2012 | Usher | G08G 1/0965 340/425.5 |
| 2014/0114665 A1* | 4/2014 | Murgia | G10L 21/0216 704/275 |

(Continued)

OTHER PUBLICATIONS

Messner, et al., "Adaptive Differential Microphone Arrays Used as a Front-end for an Automatic Speech Recognition System," 2015 IEEE International Conference on Acoustics, Speech and Signal Processing (ICASSP), 2015, pp. 2689-2691.

(Continued)

*Primary Examiner* — Disler Paul
(74) *Attorney, Agent, or Firm* — Troutman Sanders LLP; Ryan A. Schneider; Christopher C. Close, Jr.

(57) ABSTRACT

An aerial acoustic acquisition system including: an unmanned aerial vehicle (UAV); an acoustic sensing payload attached to the UAV including: at least one SOI microphone configured to detect a first audio signal including a signal of interest; and at least one noise detection microphone configured to detect a second audio signal including sound generated by the UAV, and a processing suite including a processor configured to receive first audio data corresponding to the first audio signal and second audio data corresponding to the second audio signal from the acoustic sensing suite, and process the first audio data using the second audio data to extract the signal of interest from the first audio data.

19 Claims, 9 Drawing Sheets

(51) Int. Cl.
*B64D 43/00* (2006.01)
*H04R 1/40* (2006.01)
*H04R 1/02* (2006.01)

(52) U.S. Cl.
CPC .......... *B64C 2201/12* (2013.01); *H04R 1/028* (2013.01); *H04R 2201/401* (2013.01); *H04R 2201/403* (2013.01); *H04R 2201/405* (2013.01); *H04R 2410/05* (2013.01)

(58) Field of Classification Search
CPC .......... H04R 2201/405; H04R 2410/05; B64C 39/024; B64C 2201/12; B64C 2201/108
USPC ........................................ 381/94.1, 94.7, 92
See application file for complete search history.

(56) References Cited

U.S. PATENT DOCUMENTS

| | | | |
|---|---|---|---|
| 2016/0337771 A1* | 11/2016 | Di Censo | H04R 29/00 |
| 2017/0110142 A1* | 4/2017 | Fan | G10L 21/0216 |
| 2017/0220036 A1* | 8/2017 | Visser | G05D 1/0808 |
| 2017/0274993 A1* | 9/2017 | Beckman | B64C 39/024 |
| 2017/0352349 A1* | 12/2017 | Vrazic | G10L 15/20 |

OTHER PUBLICATIONS

Nunes, et al., "A Steered-Response Power Algorithm Employing Hierarchical Search for Acoustic Source Localization Using Microphone Arrays," IEEE Transactions on Signal Processing, Oct. 2014, vol. 62, No. 19, pp. 5171-5181.

Soede, et al., "Development of a Directional Hearing Instrument Based on Array Technology," The Journal of the Acoustical Society of America, 1993, vol. 94, pp. 785.

\* cited by examiner

AERIAL ACOUSTIC SENSING, ACOUSTIC SENSING PAYLOAD AND AERIAL VEHICLE INCLUDING THE SAME

CROSS-REFERENCE TO RELATED APPLICATIONS

This application claims the benefit of U.S. Provisional Application No. 62/338,084, filed 18 May 2016, the entire contents and substance of which is hereby incorporated by reference.

TECHNICAL FIELD

The present disclosure is related generally to unmanned aerial-based acoustic sensing, and more particularly to acoustic sensing payloads and unmanned aerial vehicles including the same.

BACKGROUND

Capturing of acoustic information is known to be performed from a static location. In addition, the use of cameras on aerial vehicles to collect information is known. But, significant technical challenges exist in sensing acoustic information from aerial vehicles. In particular, due to rigorous size, weight, and power requirements and corresponding technical challenges necessary to integrate acoustic sensing payload hardware, no related art system can reliably capture voice communication from an unmanned aerial vehicle (UAV). Therefore, a need exists for an acoustic sensing payload that is capable of collecting acoustic data from a UAV.

SUMMARY

Briefly described, and according to one embodiment, aspects of the present disclosure generally relate to systems and methods for sensing acoustic data using an unmanned aerial vehicle (UAV). Certain embodiments may include an aerial acoustic acquisition system including a UAV, an acoustic sensing suite attached to the UAV, and a processor. The acoustic sensing suite may include one or more signal microphones oriented to detect at least a first audio signal and one or more reference microphones oriented to detect a second audio signal including noise generated by operation of the UAV. The processor may be configured to receive the first audio signal (e.g., a raw signal of interest) and the second audio signal (e.g., a reference acoustic signal), and to adaptively filter the first audio signal using the second audio signal to extract embedded signal of interest from the first audio signal.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DESCRIPTION

Certain embodiments of the disclosed technology provide systems and methods for reliably detecting acoustic audio signals from aerial vehicles. Embodiments of the disclosed technology may provide systems and methods for reliably detecting acoustic signals of interest, such as voice signals from unmanned aerial vehicles (UAV).

In the following description, numerous specific details are set forth. It is to be understood, however, that embodiments of the disclosed technology may be practiced without these specific details. In other instances, well-known methods, structures and techniques have not been shown in detail in order not to obscure an understanding of this description. References to "one embodiment," "an embodiment," "example embodiment," "various embodiment," etc., indicate that the embodiment (s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example embodiments of the disclosed technology will now be described with reference to the accompanying figures.

Figure 1:
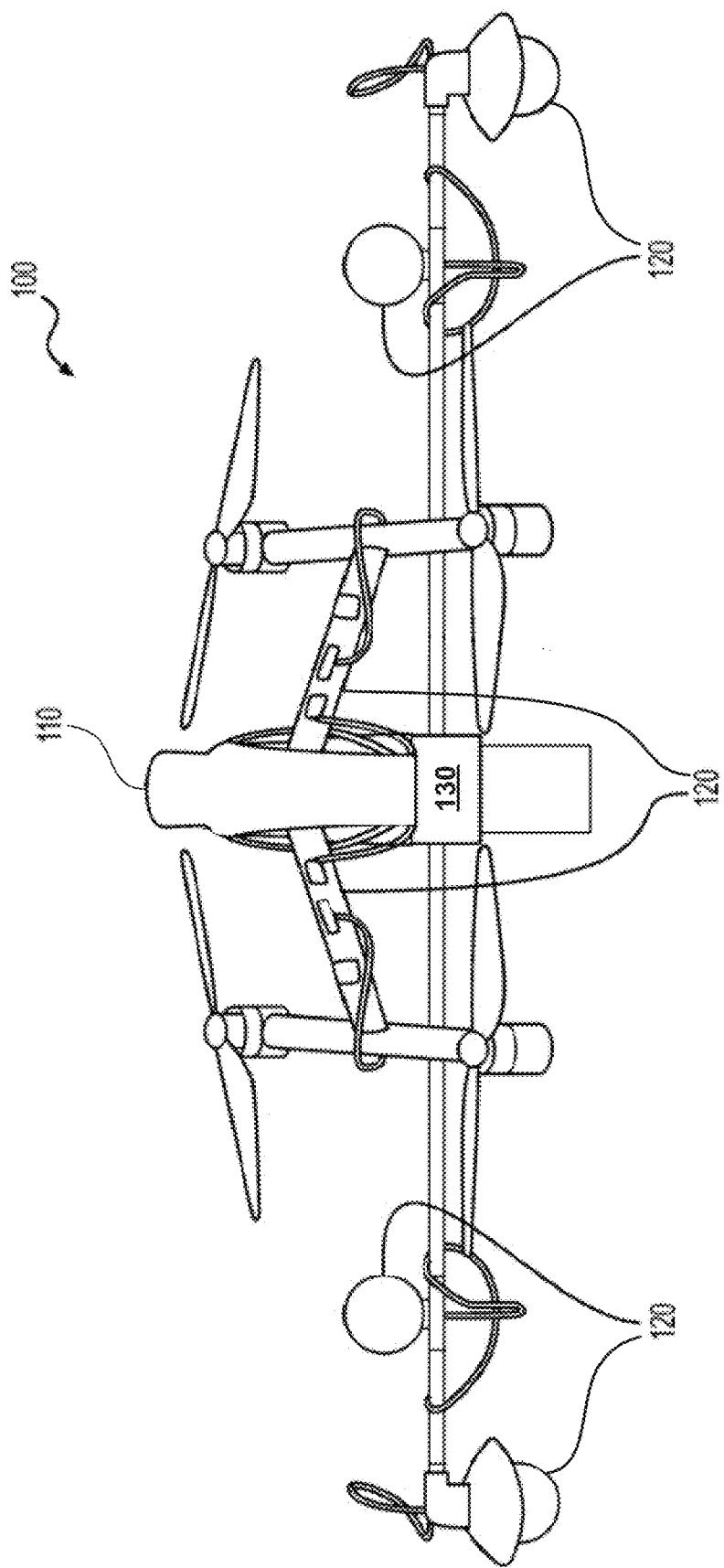
FIG. 1 illustrates an aerial acoustic acquisition system according to an exemplary embodiment.

As desired, implementations of the disclosed technology may include an aerial acoustic acquisition system with more or less of the components illustrated in FIG. 1. It will be understood that the aerial acoustic acquisition system 100 is provided for example purposes only and does not limit the scope of the various implementations of the present disclosed systems and methods.

According to some embodiments, and as shown in FIG. 1, an aerial acoustic acquisition system 100 includes a UAV 110, an acoustic sensing suite 120, e.g., an acoustic sensing payload, and a processing suite 130. The UAV 110 as depicted in FIG. 1 is a four-rotor helicopter, i.e., a quadcopter. However, as desired, the UAV 110 may be implemented as a single or multi-rotor helicopter or as a fixed-wing vehicle. The acoustic sensing suite 120 can include various hardware for detected acoustic signals. The acoustic sensing suite 120 may be attached to the UAV 110 and will be described in greater detail below. The processing suite 130 may include various hardware and software for processing the acoustic signals detected by the acoustic sensing suite 120. The processing suite 130 will be described in greater detail below.

Figure 2:
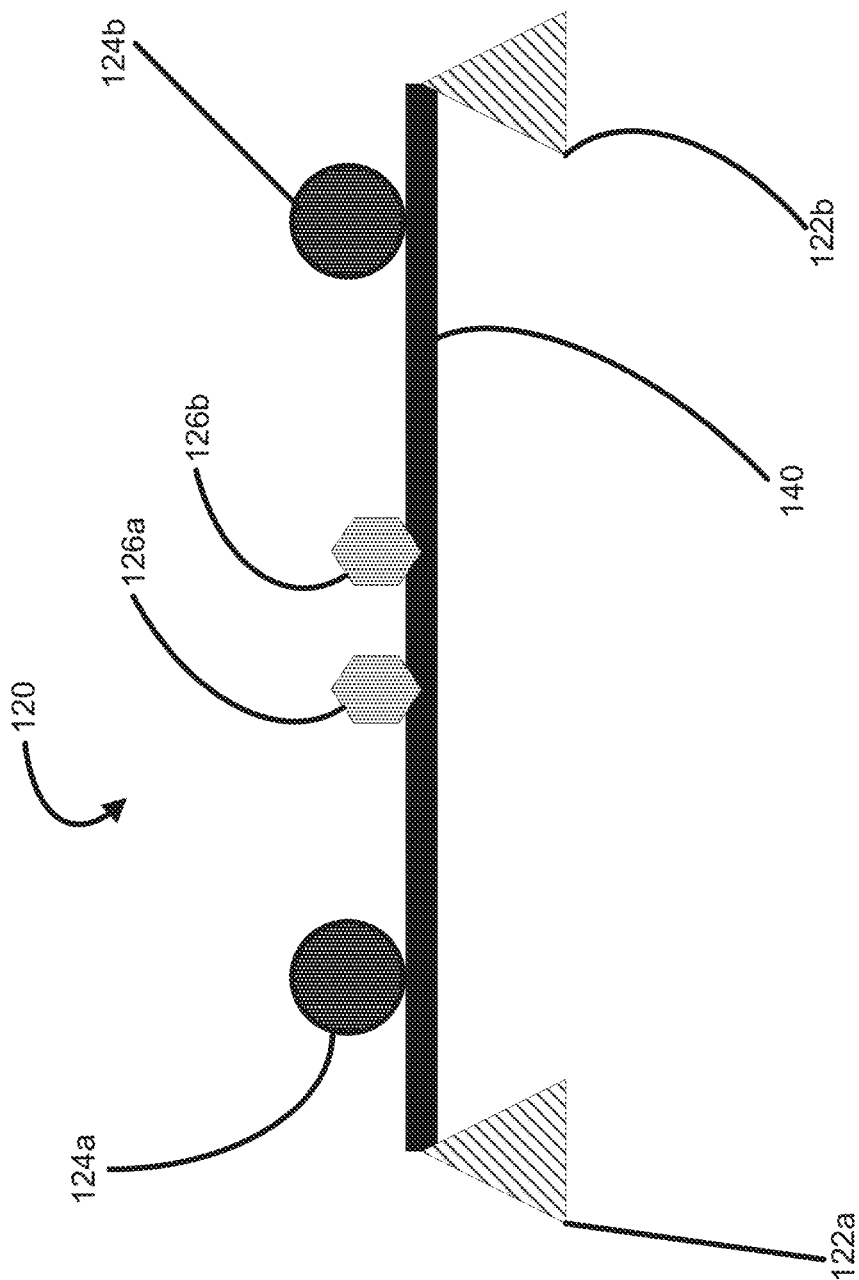
FIG. 2 illustrates an acoustic sensing suite according to an exemplary embodiment.

FIG. 2 illustrates the acoustic sensing suite 120 of FIG. 1 in greater detail. In some examples, the acoustic sensing suite 120 may include one or more signal of interest (SOI) microphone 122 configured to detect a SOI, and one or more noise detection microphones (e.g., one or more reference microphones 124 or one or more body microphones 126). As illustrated in FIG. 2, the acoustic sensing suite 120 can include multiple SOI microphones 122-a and 122-b, multiple reference microphones 124-a and 124-b, and multiple body microphones 126-a and 126-b. The microphones may be configured and oriented to detect specific acoustic signal characteristics.

The SOI microphones 122-a and 122-b and the reference microphones 124-a and 124-b may be attached to a customized support structure such as a rod 140 or fixture extending from the body of the UAV 110. However, this is merely an example and it will be understood that the SOI microphones 122-a and 122-b and the reference microphones 124-a and 124-b may be attached in alternative various ways, such as, as a non-limiting example, modifications to or integration within the UAV 110. The SOI microphones 122-a and 122-b and two reference microphones 124-a and 124-b may be positioned in a reduced noise environment or zone, such as outside of a downwash region of the UAV 110. The body microphones 126-a and 126-b may be adjacent to the UAV 110 or attached directly to a body of the UAV 110. The SOI microphones 122-a and 122-b may be oriented in the direction of the expected SOI relative to the UAV's flight position, for example, downwards. The two reference microphones 124-a and 124-b may oriented according to a particular application, for example, a direction most necessary for capturing noise produced by the UAV 110. For example, in some implementations, the two reference microphones 124-a and 124-b may oriented in a same direction as the SOI microphones 122-a and 122-b. In some implementation, the two reference microphones 124-a and 124-b may oriented in an opposite direction as the SOI microphones 122-a and 122-b. In some implementation, an orientation of the two reference microphones 124-a and 124-b may be unrelated to an orientation of the SOI microphones 122-a and 122-b.

It will be understood that the proper placement of all microphones, such as the configuration, attachment, and orientation, may be dependent upon a variety of factors such as, as non-limiting examples, the specific UAV, flight operations of the UAV (such as altitude, flight path, or forward flight speed), and the expected position and acoustic characteristics of the SOI. Configuration considerations for the SOI microphones may include positioning the SOI microphones to maximize the microphone's field of view relative to the expected source while minimizing confounding physical effects such as hydrodynamic noise (downwash from the rotors), wind noise (due to forward flight), or pre-existing hardware geometries. Configuration consideration for the reference microphones may include positioning the reference microphones to maximize exposure to known external noise sources contaminating raw SOI data, such as placing the reference microphones near external noise sources (nearby operating ground or flight vehicles), specific onboard noise sources (rotors, propellers, mufflers, engines), or subsystems which emit dominant acoustic phenomena (such as tonal emission or low frequency noise). Body microphones may be installed to supplement primary reference microphones and capture additional contaminating noise emitted throughout the body of the UAV. One of ordinary skill would understand that a final configuration for any given UAV acoustic sensing payload may require a trade-off and optimization of microphone placement and configuration based upon these, as well as other, principals.

Although the acoustic sensing suite 120 illustrated in FIG. 2 includes two SOI microphones 122-a and 122-b, two reference microphones 124-a and 124-b, and two body microphones 126-a and 126-b, this is merely an example. As desired, the acoustic sensing suite 120 may include one or more SOI microphones, one or more reference microphones, and zero or more body microphones. As desired, the acoustic sensing suite may include a phased array of microphones. As desired, the array of microphones may be used in lieu of the SOI microphones.

Figure 3A:
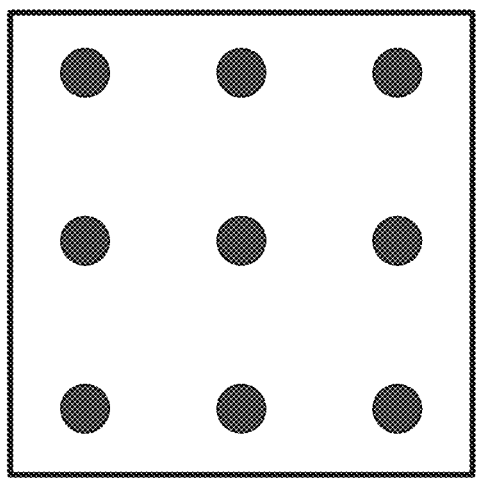
FIGS. 3A-3D illustrate various phased arrays of microphones for use in the acoustic sensing suite and acoustic beamforming according to one or more exemplary embodiments.
Figure 3B:
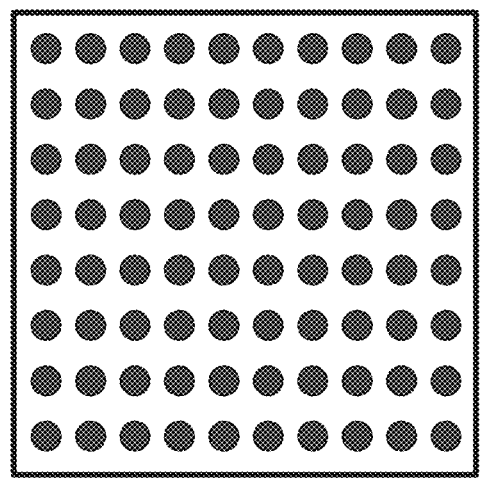
Figure 3C:
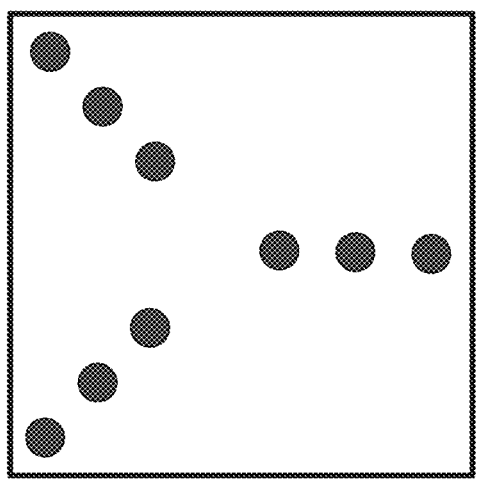
Figure 3D:
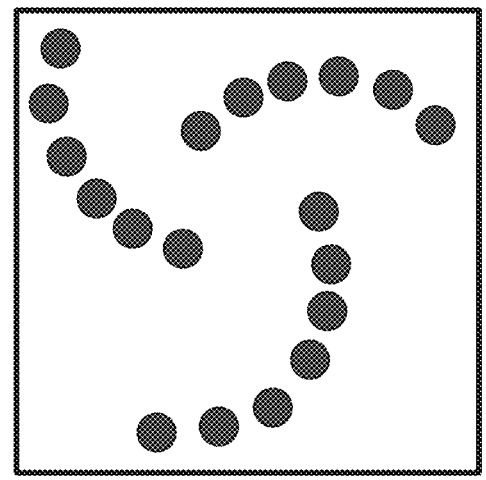

FIGS. 3A-3D illustrate various arrays of microphones for use in the acoustic sensing suite 120. FIG. 3A illustrates an array of nine microphones in a 3×3 box pattern. FIG. 3B illustrates an array of 64 microphones in an 8×8 box pattern. FIG. 3C illustrates an array of nine microphones in a spoke pattern. FIG. 3D illustrates an array of 17 microphones in a multi-spiral pattern. An array of microphones may be configured for acoustic beamforming. The acoustic beamforming may be targeted to speech. It will be understood that the selection of a phased array configuration may be dependent upon a specific application, hardware requirements of the system, and desired flight operation. As a non-limiting example, to incorporate acoustic beamforming, source localization, and speech detection, an acoustic phased array would be required for the acoustic sensing payload. To be integrated onto a small UAV with very limited payload capacity, the phased array pattern would require a minimized number of microphones capable of generating a coarse yet sufficient beam pattern necessary to discern the SOI. For a large UAV with a high payload capacity (e.g., fifty or more pounds) and having a high fidelity source localized requirement from the payload, a phased array with a significantly higher number of microphones is required. A specific array pattern may be selected and through modeling and simulation to determine a microphone configuration that generates the most appropriate beam pattern characteristics to steer, locate, and focus on the SOI. Different microphone patterns generate different technical operating capabilities (such as, as non-limiting examples, range to target, width of beam pattern, ability to steer the acoustic beam, size of field of view) and it may be desirable to down-select to match the desired application requirements. Advantages and disadvantages may be determined during a trade-off comparative analysis. For example, a high fidelity phased array with high range typically requires more power, processing capability, number of microphones, and size/weight allowances than a smaller and more easily integrated payload that may deliver lower signal resolution.

It will be understood that the arrangement of microphones illustrated in FIGS. 3A-3D is exemplary, and additional or alternative arrangements and numbers of microphones may be used in the acoustic sensing suite.

Figure 4:
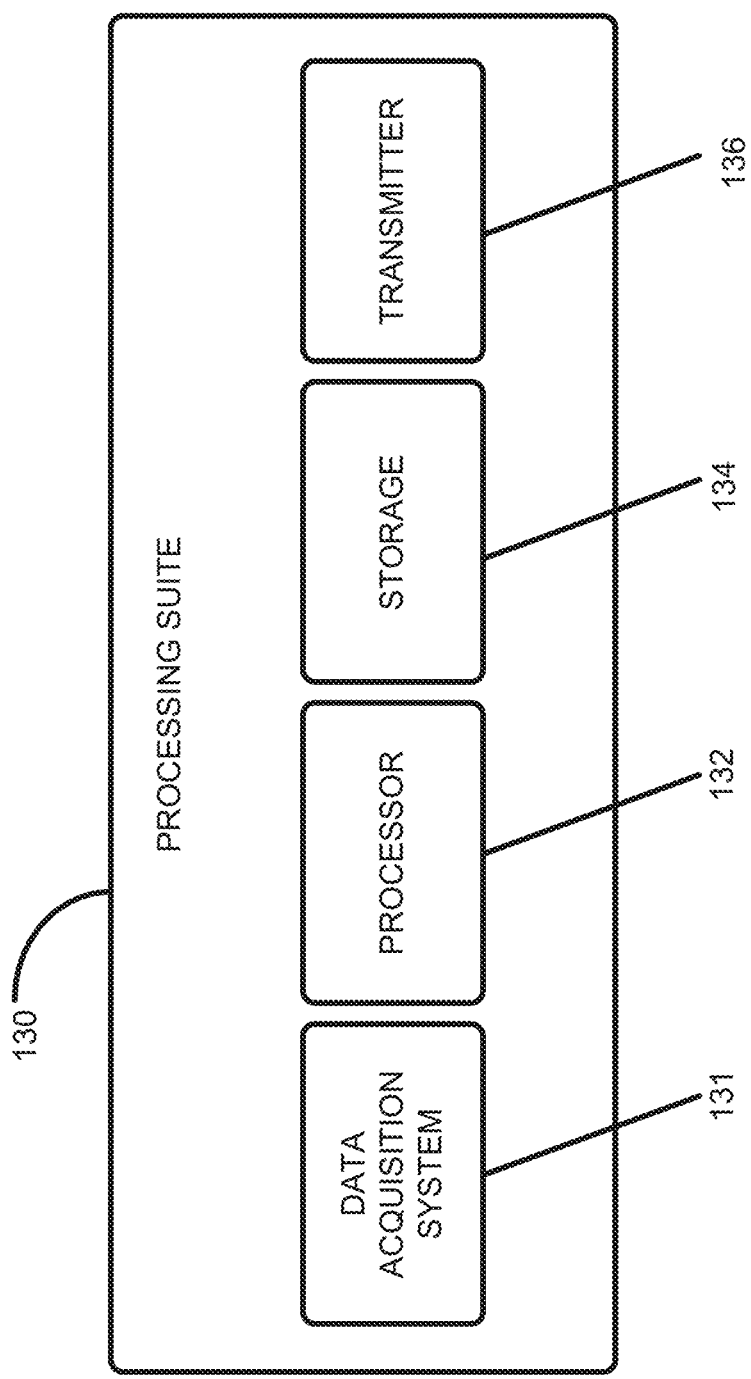
FIG. 4 illustrates a processing suite according to an exemplary embodiment.

FIG. 4 illustrates a processing suite 130, according to some embodiments, in greater detail. As shown in FIG. 4, the processing suite 130 includes an onboard data acquisition system 131, a processor 132, a storage 134, and a transmitter 136, e.g., a communicator or a transceiver. The onboard data acquisition system 131 may acquire signal data from one or more microphones and transfer the data to the processor 132, the storage 134, or the transmitter 136.

The processor 132 may be a special purpose processor or a general purpose processor. The processor 132 may receive acoustic signals detected by the acoustic sensing suite 120 and perform processing on the detected acoustic signals to extract a signal of interest.

For example, the processor 132 may process the acoustic signals detected by the one or more SOI microphones 122 using acoustic signals detected by the one or more reference microphones 124 and the one or more body microphones to extract a signal of interest. As a non-limiting example, the processor 132 may use signals from the SOI microphones 122, reference microphones 124, and body microphones 126 as inputs into an advanced digital signal processing algorithm suite. The algorithm suite may identify dominant time domain and frequency domain acoustic characteristics present in acoustic data provided by the reference and body microphones, and may have been simultaneously captured by the SOI microphones. These dominant characteristics, being of higher amplitude, energy, and spectral content than that acquired by the SOI microphones, may be used as baseline waveforms to filter from acoustic data provided by the SOI microphones. That is, the acoustic data provided by the SOI microphones may be processed by filtering algorithms, using the baseline waveforms, which reduce the energy content of the baseline waveforms in the raw signal of interest, leaving a filtered signal which is predominantly comprised of SOI energy presented as a useable, discernible, filtered signal.

The processor 132 may be configured to adaptively filter the acoustic signals detected by the one or more SOI microphones 122 using the acoustic signals detected by the noise detection microphones to extract a voice signal. The processor 132 may utilize adaptive filtering algorithms based upon one or more of a synchronized least-mean-squares filter, a cascaded least-mean-squares filter, and an adaptive notch filter to adaptively filter the acoustic signals detected by SOI microphones 122. It will be understood that selection of one or more filtering algorithms or other filtering approaches may be determined by a desired algorithm performance and resulting SOI data fidelity. Modeling and simulation of potential algorithms may be conducted to determine characteristics of the potential algorithms, such as processing latency, overall time required to process signal(s), algorithm accuracy (e.g., does it filter too much, too little, or the right amount of energy in the specified frequency bands), fidelity of the final signal, and processor requirements to implement the algorithm in a useable system. Selection of the filtering approaches may be made in conjunction with microphone selection and configuration, flight operation requirements, operating conditions, and overall expected performance. The processor 132 may store the extracted signal of interest in the storage 134. The processor 132 may control the transmitter 136 to transmit the signal of interest extracted by the processor 132. According to some embodiments, the data acquisition system 131 may be embedded with the processor 132.

The storage 134 may store various programs executable by the processor 132. For example, the storage 134 may store a program executable by the processor 132 that instructs the processor 132 to filter the acoustic signals detected by the one or more SOI microphones 122 to extract the signal of interest. The storage 134 may also store a program executable by the processor that instructs the processor to transmit raw data to the receiver and human-in-the-loop, so that ground based processing of the data may be conducted.

The transmitter 136 may be configured to wirelessly transmit signals, for example, to a base station or through a satellite uplink. The signals may be, as non-limiting examples, radio signals, WiFi signals, Bluetooth signals, cellular signals, LTE signals, infrared signals, 2G, 3G, and 4G signals, and ZigBee signals. The signals may be encoded before transmission by the transmitter 136.

Although the processing suite 130 is depicted as separate from the UAV 110, as desired, the processing suite 130 may be partially or fully integrated with the UAV 110. For example, the UAV 110 may include an on-board processor 112, an on-board storage 114, and an on-board transmitter 116 that may be used instead of a separate processor 132, storage 134, or transmitter 136.

Figure 5:
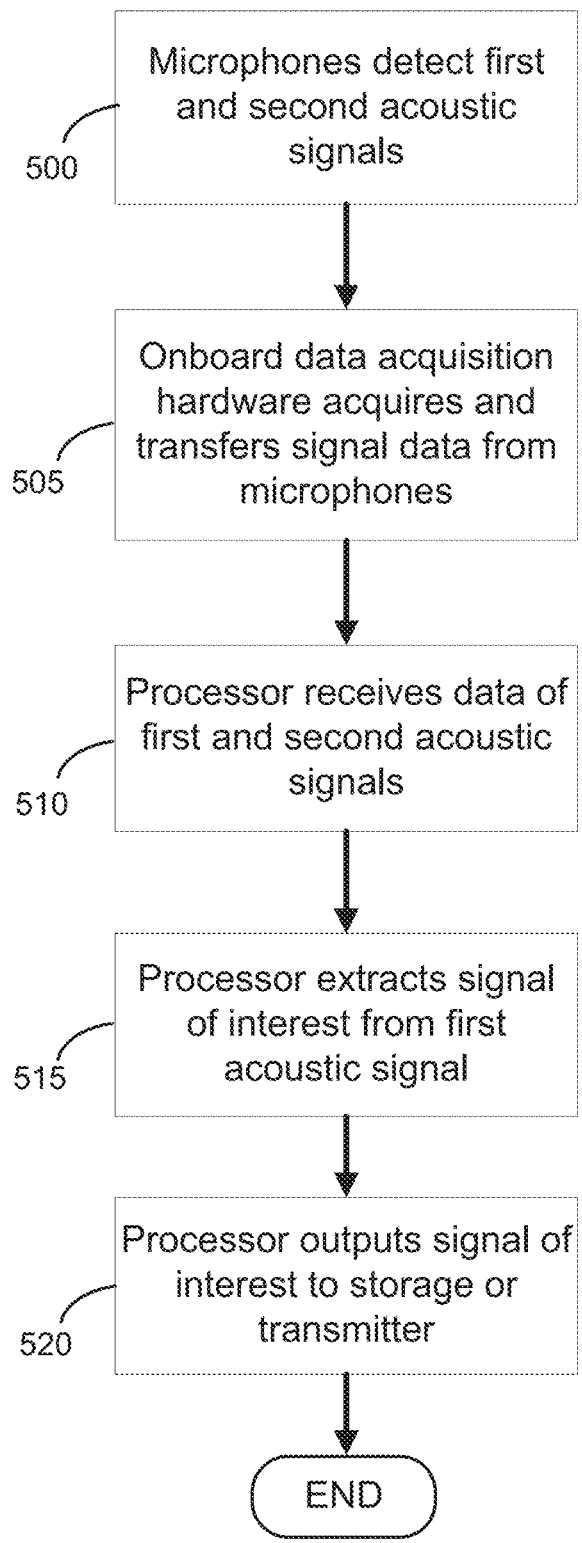
FIG. 5 illustrates a method of operation of the aerial acoustic acquisition system according to an exemplary embodiment.

FIG. 5 is a flow-chart illustrating a method of operation of the aerial acoustic acquisition system 100 according to an exemplary embodiment. As shown in FIG. 5, at least one SOI microphone and at least one noise detection microphone detect 500 respective first and second acoustic signals. The onboard data acquisition system 131 acquires and transfers 505 resulting data detected by the microphones to the processor 132. According to some exemplary embodiments, the onboard data acquisition system 131 may additionally or alternatively transfer the resulting data to the onboard storage 134 or the transmitter 136 for the transmission of raw data.

The processor 132 receives 510 the first and second acoustic signals. The processor 132 processes 515 the first acoustic signal using the second acoustic signal to extract a signal of interest. The processor 132 outputs 520 the signal of interest to the storage 134 of the transmitter 136.

The processing 515 may include the processor 132 performing adaptive filtering, acoustic beamforming, or advanced digital signal processing on the first acoustic signal. For example, the processor 132 may use one or more of a synchronized least-mean-squares filter, a cascaded least-mean-squares filter, and an adaptive notch filter to extract the signal of interest from the first acoustic signal. The signal of interest may be speech.

Although in some examples the signal-of-interest has been described as a voice signal, this is merely an example. According to some embodiments the signal of interest may be one or more of vehicle noise signatures, environmental noise, and a user-defined acoustic signal. As a non-limiting example, a captured environmental noise to an expected environmental noise with deviations between the captured and expected environmental noise corresponding to a signal of interest. As a non-limiting example, characteristics of an environment may be discerned based on environmental noise components, e.g., using acoustic fingerprinting. Individual or additional environmental noise components may represent a signal of interest to be isolated, identified, and qualified. According to some embodiments, the detection of a signal of interest may be used to locate a source of the signal of interest.

Figure 6:
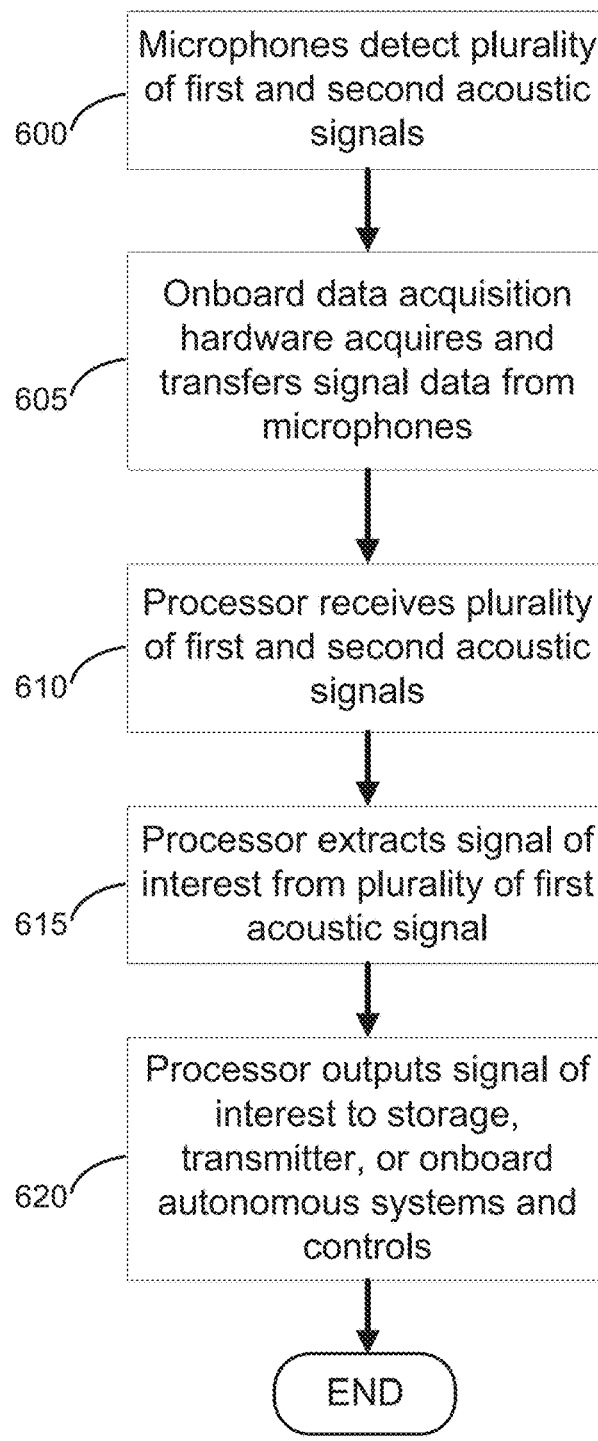
FIG. 6 illustrates a method of operation of the aerial acoustic acquisition system according to an exemplary embodiment.

FIG. 6 is a flow-chart illustrating a method of operation of the aerial acoustic acquisition system 100 according to an exemplary embodiment. As shown in FIG. 6, a plurality of SOI microphones and a plurality of noise detection microphones detect 600 a plurality of first acoustic signals and plurality of second acoustic signals, respectively. The integrated data acquisition system 131 acquires and transfers 605 resulting data detected by the microphones to the processor 132. According to some exemplary embodiments, the onboard data acquisition system 131 may additionally or alternatively transfer the resulting data to the onboard storage 134 or the transmitter 136 for the transmission of raw data.

The processor 132 receives 610 the plurality of first acoustic signals and the plurality of second acoustic signals. The processor 132 processes 615 the plurality of first acoustic signal using the plurality of second acoustic signals to extract a signal of interest. The processor 132 outputs 620 the signal of interest to the storage 134, the transmitter 136, or integrated onboard autonomous control systems (such as, as non-limiting examples, flight controller, motorized gimbal, or other onboard sensors).

The processor 132 may perform adaptive filtering on the plurality of first acoustic signals in 615. As non-limiting examples, the processor 132 may use one or more of a synchronized least-mean-squares filter, a cascaded least-mean-squares filter, and an adaptive notch filter to extract the signal of interest from the plurality of first acoustic signals. In addition, in some embodiments, the processor 132 may use acoustic beamforming algorithms to cross-correlate, filter, and process the first acoustic signals. In some embodiments, the signal of interest may be speech.

Figure 7:
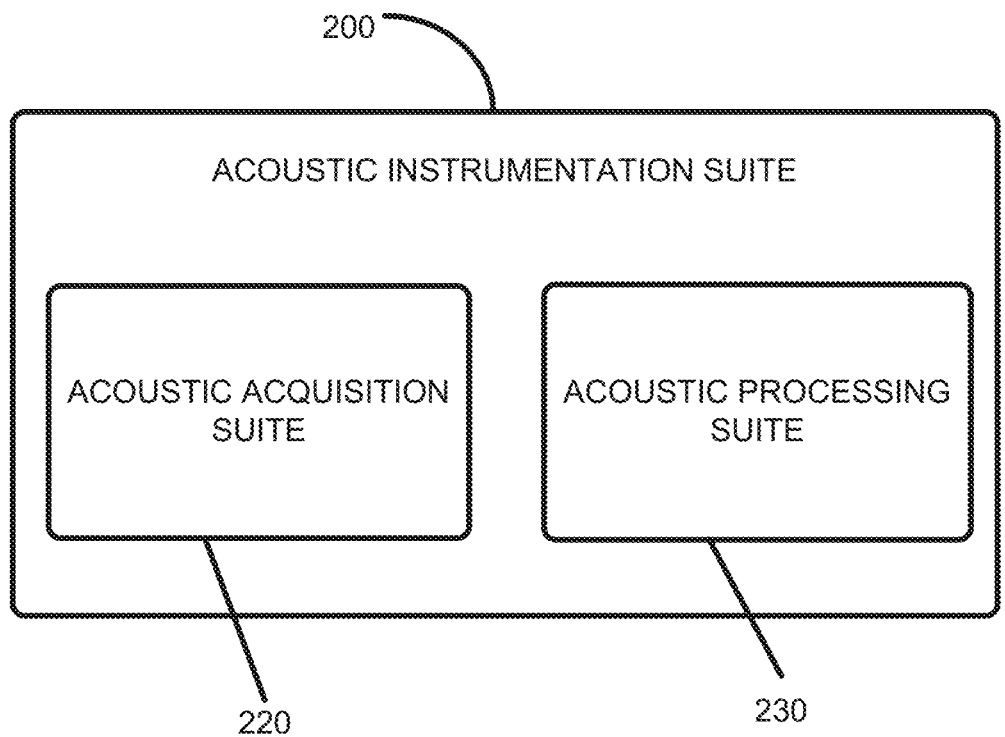
FIG. 7 illustrates an acoustic acquisition payload according to an exemplary embodiment.

FIG. 7 illustrates an acoustic acquisition payload 200 according to an exemplary embodiment. The acoustic acquisition payload 200 may be attached to a UAV 110 in order to provide acoustic acquisition capabilities to the UAV 110. For example, the acoustic acquisition payload 200, when incorporated with the UAV 110, may enable the UAV 110 to reliably detect a signal of interest, e.g., a voice acoustic signal. The acoustic acquisition payload 200 may enable the UAV 110 to perform acoustic beamforming targeted to speech.

As seen in FIG. 7, the acoustic acquisition payload 200 can include an acoustic sensing suite 220 and a processing suite 230. The acoustic sensing suite 220 and the processing suite 230 may be significantly similar to the acoustic sensing suite 120 and the processing suite 130 described above. Accordingly, a detailed description thereof will not be repeated. As discussed above, one or more elements embedded within the UAV 110 may be used instead of one or more elements of the processing suite 230. The acoustic acquisition payload 200 may be modular and adjustable to various UAV configurations.

Figure 8A:
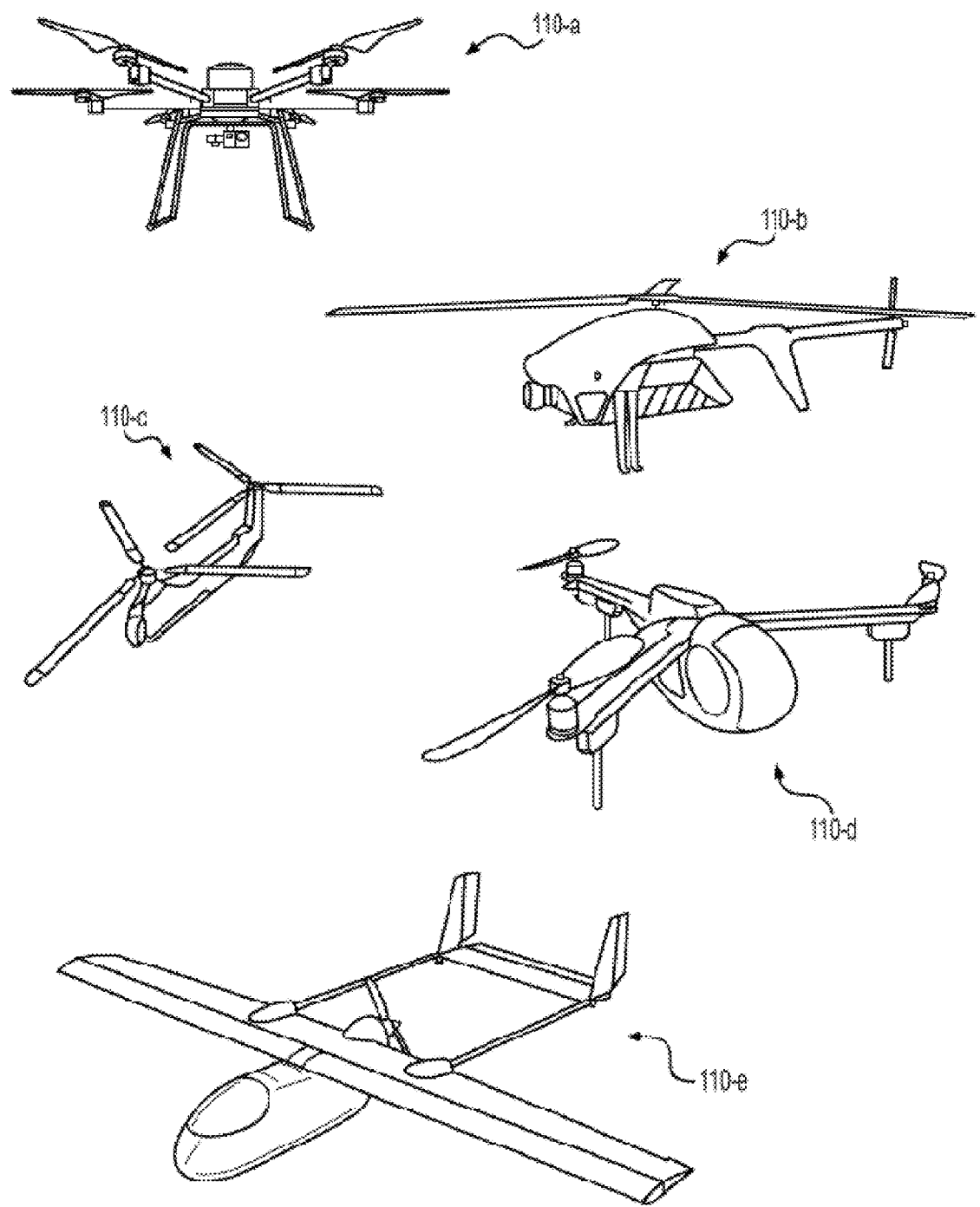
FIGS. 8A and 8B illustrate various configurations of an unmanned aerial vehicle for use in an aerial acoustic acquisition system according to an exemplary embodiment.
Figure 8B:
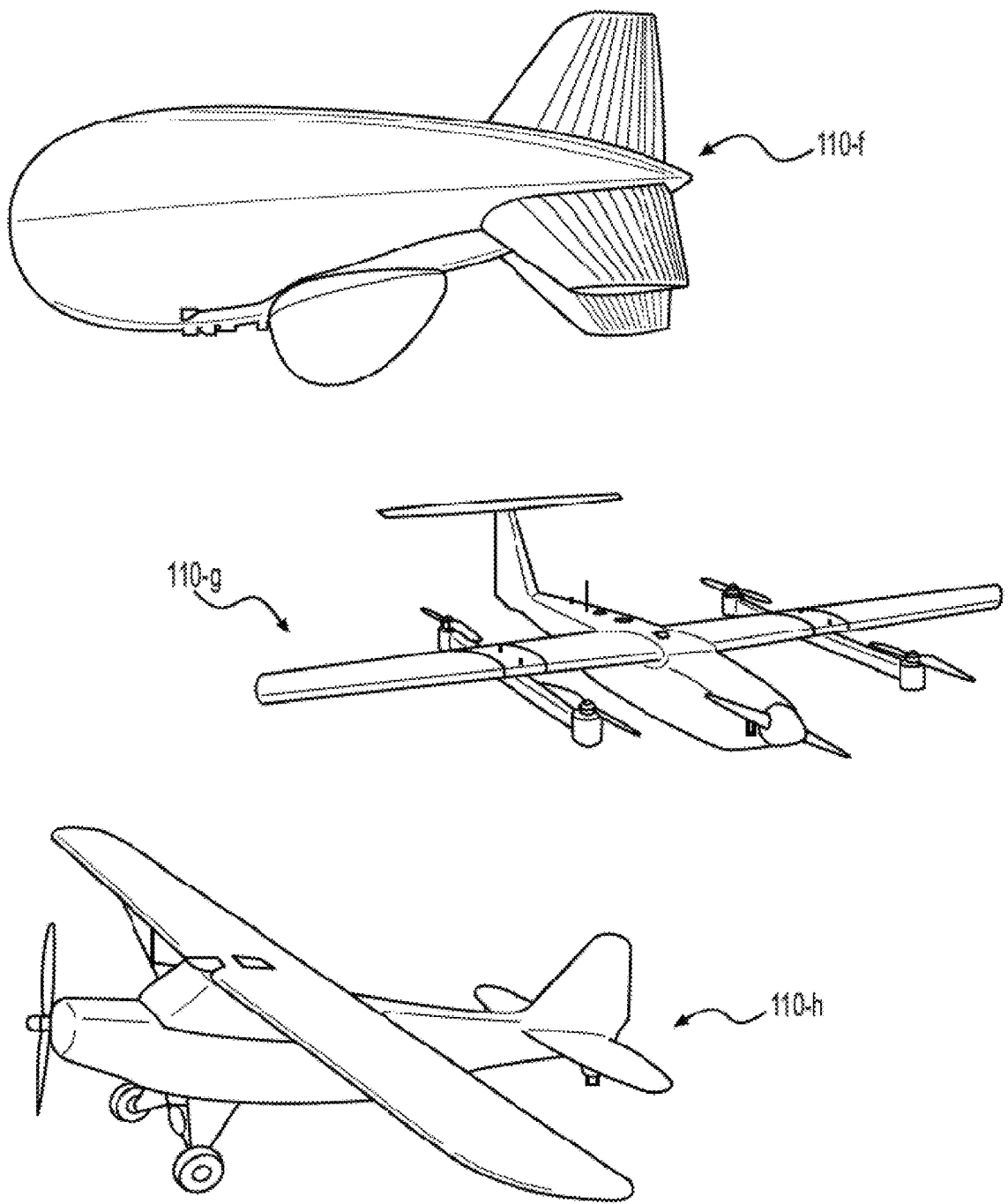

As desired, FIGS. 8A and 8B illustrate various configurations of a UAV 110 for use in the aerial acoustic acquisition system 100. According to FIG. 8A, the UAV 110 may be a quadcopter 110-*a*, a single rotor helicopter 110-*b*, a dual-rotor helicopter 110-*c*, a tri-rotor helicopter 110-*d*, or a rear mounted propeller-fixed wing UAV 110-*e*. According to FIG. 8B, the UAV 110 may be an aerostat 110-*f*, a vertical take-off and landing (VTOL) UAV 110-*g*, or a forward mounted propeller-fixed wing UAV 110-*h*. It will be understood that the UAVs illustrated in FIGS. 8A and 8B are for illustrative purposes only, and the UAV 110 as used in an aerial acoustic acquisition system 100 should not be limited thereto.

It will be understood that selection of a UAV configuration for a given application may depend on constraints associated with the desired performance and operating parameters. For example, in some configurations, fixed wing based UAVs may be better equipped to handle long distance flights, ground focused scanning and localization, acoustic fingerprinting of a large environment, or surveillance. Meanwhile, in some configurations, rotor based UAVs may be better for stationary acoustic acquisition, acquiring time lapse data, detection and signal isolation in urban environments, speech acquisition for extended conversations, or directed search and rescue missions. In addition, in some examples, distributed acoustic sensing payloads can be developed to transmit to additional payloads over multiple UAVs to create a distributed airborne sensing network. Distributed acoustic sensing may be accomplished using various combinations of UAV configurations.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person of ordinary skill to practice certain embodiments of the disclosed technology, including making and using any devices or systems and performing any incorporated methods. The patentable scope of certain embodiments of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. An aerial acoustic acquisition system comprising:
   an unmanned aerial vehicle (UAV);
   an acoustic sensing payload attached to the UAV comprising:
   at least one SOI microphone configured to detect a first audio signal including a signal of interest; and
   a plurality of noise detection microphones configured to detect a second audio signal, the plurality of noise detection microphones comprising (i) at least one reference microphone directed toward one or more dynamic noise sources and (ii) at least one body microphone directed toward a previously identified noise source relative to the body of the UAV; and
   a processing suite comprising a processor configured to (i) receive first audio data corresponding to the first audio signal and second audio data corresponding to the second audio signal from the acoustic sensing payload and (ii) process the first audio data by adaptively filtering the first audio data using a synchronized least-mean-squares filter using the second audio data detected by the at least one reference microphone and a cascaded least-mean-squares filter using the second audio data detected by the at least one body microphone to extract the signal of interest from the first audio data.

2. The aerial acoustic acquisition system according to claim 1, wherein the UAV comprises a multi-rotor unmanned aerial system comprising a plurality of rotors, an aerostat, or a fixed wing unmanned aerial system capable of forward flight with an internal combustion engine or electric propulsion system.

3. The aerial acoustic acquisition system according to claim 1, wherein the signal of interest comprises at least one from among an acoustic voice signal, vehicle noise signatures, environmental noise, and a user-defined acoustic signal.

4. The aerial acoustic acquisition system according to claim 1, wherein the at least one SOI microphone comprises a plurality of microphones configured to perform acoustic beamforming toward a source of the signal of interest.

5. The aerial acoustic acquisition system according to claim 1, wherein the at least one SOI microphone comprises a microphone array arranged in a multi-spoke pattern configured to perform acoustic beamforming toward a source of the signal of interest.

6. The aerial acoustic acquisition system according to claim 1, wherein the acoustic sensing payload is modular.

7. The aerial acoustic acquisition system according to claim 1, wherein the at least one SOI microphone is located in a reduced noise zone of the UAV.

8. The aerial acoustic acquisition system according to claim 1, wherein
the processing suite further comprises a storage, and
the processor is further configured to store the extracted signal of interest in the storage.

9. The aerial acoustic acquisition system according to claim 1, wherein
the processing suite further comprises a transmitter, and
the processor is further configured control the transmitter to transmit the extracted signal of interest.

10. The aerial acoustic acquisition system according to claim 1, wherein
the at least one SOI microphone comprises two microphones that are (i) oriented in a direction of a source of the signal of interest with respect to a body of the UAV and (ii) located in a reduced noise zone of the UAV,
the at least one reference microphone comprises two reference microphones located in the reduced noise zone of the UAV disposed adjacent to or directly on the body of the UAV, and
the signal of interest comprises at least one from among an acoustic voice signal, vehicle noise signatures, environmental noise, and a user-defined acoustic signal.

11. The aerial acoustic acquisition system according to claim 10, wherein
the UAV comprises one or more rotors, and
the at least one body microphone comprises two body microphones that are disposed laterally from the body of the UAV outside of a downwash region of the one or more rotors, and the two body microphones are directed toward the one or more rotors.

12. An acoustic sensing payload for an unmanned aerial vehicle (UAV), the acoustic sensing payload comprising:
an acoustic sensing suite comprising
at least one SOI microphone configured to detect a first audio signal including a signal of interest; and
a plurality of noise detection microphones configured to detect a second audio signal, the plurality of noise detection microphones comprising (i) at least one body microphone configured to be directed toward a previously identified body noise source relative to a body of the UAV and (ii) at least one reference microphone configured to be directed toward one or more dynamic noise sources; and
a processing suite comprising a processor configured to (i) receive first audio data corresponding to the first audio signal and second audio data corresponding to the second audio signal from the acoustic sensing suite and (ii) process the first audio data by adaptively filtering the first audio data using a cascaded least-mean-squares filter using the second audio data detected by the at least one body microphone and a synchronized least-mean-squares filter using audio data detected by the at least one reference microphone to enhance the signal of interest contained in the first audio data.

13. The acoustic sensing payload according to claim 12, wherein the signal of interest comprises at least one from among an acoustic voice signal, vehicle noise signatures, environmental noise, and a user-defined acoustic signal.

14. The acoustic sensing payload according to claim 12, wherein the at least one SOI microphone comprises a plurality of microphones configured to perform acoustic beamforming toward a source of the signal of interest.

15. The acoustic sensing payload according to claim 12, wherein the at least one SOI microphone comprises a microphone array configured to perform acoustic beamforming toward a source of the signal of interest.

16. The acoustic sensing payload according to claim 12, wherein the acoustic sensing suite is modular.

17. The acoustic sensing payload according to claim 12, wherein
the processing suite further comprises a storage, and
the processor is further configured to store the extracted signal of interest in the storage.

18. The acoustic sensing payload according to claim 12, wherein
the processing suite further comprises a transmitter, and
the processor is further configured control the transmitter to transmit the extracted signal of interest.

19. The acoustic sensing payload according to claim 12, wherein
the at least one SOI microphone comprises two microphones that are configured to be (i) oriented in a direction of a source of the signal of interest with respect to a body of the UAV and (ii) located in a reduced noise zone of the UAV,
the at least one reference microphone comprises two reference microphones configured to be located in the reduced noise zone of the UAV, each of the two reference microphones being body microphones configured to be disposed adjacent to or directly on a body of the UAV, and
the signal of interest comprises at least one from among an acoustic voice signal, vehicle noise signatures, environmental noise, and a user-defined acoustic signal.

* * * * *